United States Patent
Risse et al.

(10) Patent No.: US 6,169,153 B1
(45) Date of Patent: Jan. 2, 2001

(54) POLYMERIZATION OF CYCLOPENTADIENE USING CATIONIC PALLADIUM COMPLEXES

(75) Inventors: Wilhelm Risse, Dublin; Christof Mehler, Ludwigshafen, both of (DE); Eric Connor, Dalkey (IE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/109,766

(22) Filed: Jul. 6, 1998

(30) Foreign Application Priority Data

Jul. 11, 1997 (DE) .............................. 197 29 817

(51) Int. Cl.[7] .............................. C08F 4/80; C08F 14/18; C08F 220/12
(52) U.S. Cl. ........................ 526/171; 526/329.1; 526/249
(58) Field of Search ................... 526/249, 171, 526/329.1

(56) References Cited

U.S. PATENT DOCUMENTS

| | | | |
|---|---|---|---|
| 3,328,372 | 6/1967 | Thomas et al. | 260/93 |
| 3,387,046 | 6/1968 | Cleary | 260/666 |
| 3,498,961 | 3/1970 | Tamma | 260/93 |
| 5,180,626 * | 1/1993 | Ishibashi et al. | 428/213 |
| 5,188,875 * | 2/1993 | Yamaoka et al. | 428/64 |
| 5,290,877 * | 3/1994 | Yamaoka et al. | 525/329.5 |
| 5,693,728 * | 12/1997 | Okamoto et al. | 526/133 |
| 5,852,145 * | 12/1998 | McLain et al. | 526/133 |
| 5,866,663 * | 2/1999 | Brookhart, III et al. | . |
| 5,880,241 * | 3/1999 | Brookhart et al. | . |
| 5,880,323 * | 3/1999 | Brookhart, III et al. | . |

FOREIGN PATENT DOCUMENTS

| | | |
|---|---|---|
| 1250128 | 10/1963 | (DE) . |
| 0415270 | 3/1991 | (EP) . |
| 80-104307 | 12/1977 | (JP) . |
| 96/23010 | 8/1996 | (WO) . |

OTHER PUBLICATIONS

Melia et al. *Macromol. Symp.* 89(*Synthetic, Structural and Industrial Aspects of Stereospecific Polymerization*) pp. 433–442 (1995); corresponds to Chemical Abstracts 122(22), No. 266127 (May 29, 1995).

Mehler et al. Papers presented at the *Atlanta meeting 1991 of the ACS, Division of Polymer Chemistry; Atlanta, GA, USA vol. 32(1)*, p. 337 (Apr. 1, 1991); corresponds to Database Compendex EIX 91080465683.

*Enc. Polym. Sci. Eng.*, vol. 4, pp. 537–542, 1993.
*J. Polymer Sci.*, vol. 6, 1968, pp. 1175–1195.
*J. Polymer Sci.*, vol. 6, 1968, pp. 1163–1174.
*J. Polymer Sci.*, vol. 31, 1993. pp. 309–316.
*J. Am. Chem. Soc.*, vol. 104, 1982, pp. 3520–3522.
*Organometallics*, vol. 3, 1984, pp. 866–870.

* cited by examiner

Primary Examiner—David W. Wu
Assistant Examiner—Tanya Zalukaeva
(74) Attorney, Agent, or Firm—Keil & Weinkauf

(57) ABSTRACT

A process for preparing cyclopentadiene homopolymers having a molecular weight in the range from 10,000 to 1,000,000 and less than 35% of 1,2 linkages uses palladium catalysts of the formula $$[Pd(R^1-CN)_4]^{2+}(A)_2-,$$

where $R^1$ is an alkyl group and A is a stable anion.

7 Claims, No Drawings

POLYMERIZATION OF CYCLOPENTADIENE USING CATIONIC PALLADIUM COMPLEXES

The present invention relates to a process for preparing polymers of cyclopentadiene using a palladium catalyst, to palladium complexes which are suitable as catalyst and to the hydrogenation of the polymers obtained.

It is known that the cationic polymerization of cyclopentadiene proceeds with retention of the five-membered ring and a double bond of the cyclic diene, see Encycl. Polym. Sci. Engng., Volume 4, p. 538, Wiley Interscience, New York (1985). The polymerization over various catalysts which make possible the ationic polymerization leads to polycyclopentadiene having the following structure:

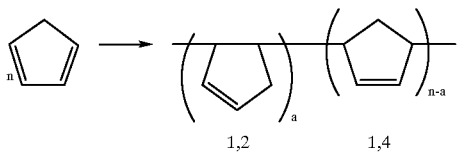

which in many cases is partially gelated.

Suitable cationic catalysts, eg. Lewis acid halides, alkylaluminum halides and titanium-, tungsten-, vanadium- and molybdenum-containing catalysts, are disclosed, for example, in U.S. Pat. No. 3,328,372, DE-A 12 50 128, U.S. Pat. No. 3,387,046, U.S. Pat. No. 3,498,961, JP 80 104 307 and JP 72 436 333. The proportion of 1,2 and 1,4 linkages of the cyclopentene rings in the polymer depends on the solvent used in the polymerization of the cyclopentadiene (J. Polym. Sci. 5 (1968), 1175) and on the cationic catalyst (J. Polym. Sci. 6 (1968), 1163). Typical values are from 40 to 50% of 1,2 linkages. The solubility of the polymer in solvents such as toluene, cyclohexane, chloroform and tetrahydrofuran is increased by a higher proportion of 1,4 linkages. However, owing to the partial gelation of the polymer, it is generally relatively low.

The double bdnd can easily be functionalized, for example by reaction with butyllithium and addition of chlorinated derivatives or hydrogenation. This enables functionalized polymers or graft copolymers having a polycyclopentadiene backbone to be obtained. Polymers of cyclopentadiene are used, for example, after hydrogenation as resins in adhesives. However, a prerequisite for this functionalization is sufficient solubility of the polycyclopentadiene in solvents which are inert under the conditions of the functionalization. The solubility of the polycyclopentadienes obtainable using previously known catalysts is, however, not satisfactory.

The use of palladium complexes as catalysts for the cationic copolymerization of cyclopentadiene with CO is known from J. Polym. Sci., 31 (1993), 309. Palladium compounds have also been used for the copolymerization of CO with a series of olefins under mild conditions by Sen et al., J. Am. Chem. Soc., 104 10 (1982), 3520 and Organometallics, 3 (1984), 866. However, in the homopolymerization of cyclopentadiene, the use of these Pd catalysts also leads to a partially crosslinked product and to a correspondingly increased proportion of 1,2 linkages.

WO 96/23010 describes palladium complexes containing bidentate ligands coordinated via N for the polymerization of monoolefins. However, these complexes are not suitable for the polymerization of conjugated dienes whose presence is even expressly excluded.

It is an object of the present invention to provide a process for preparing cyclopentadiene polymers which have a low proportion of 1,2 linkages and therefore have better solubility in many solvents.

We have found that this object is achieved by use of certain, cationic palladium catalysts to prepare polymers of cyclopentadiene having a low proportion of 1,2 linkages.

The present invention accordingly provides a process for preparing cyclopentadiene homopolymers using a palladium catalyst which comprises a palladium complex of the formula

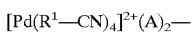

where $R^1$ is a $C_1$–$C_8$-alkyl group and A is a stable anion.

The palladium catalysts of the present invention lead to polycyclopentadiene of the above formula having a high number average molecular weight of Mn>10,000, in particular >30,000 (determined by means of gel permeation chromatography in chlorobenzene on Polymer Standards Service columns (10 μm, SDV linear, 60 cm), detection: differential refractometer (Waters R 401), polystyrene standards). The upper limit of the molecular 45 weight is generally 1,000,000, preferably 300,000. The polymer has <35%, in particular <30% and preferably <25%, of 1,2 linkages and is soluble in many organic solvents such as chloroform, toluene, cyclohexane, etc. It can, for example, advantageously be hydrogenated in a manner known per se using $H_2$ or chemical H-transferring agents. Formation of other derivatives is also readily possible since the polycyclopentadiene obtainable according to the present invention is essentially uncrosslinked and thus virtually all double bonds are still available.

The monomer cyclopentadiene is advantageously prepared by thermal cracking of the dimer at about 175° C. immediately before the polymerization in the process of the present invention. Cracking is advantageously carried out under dry nitrogen as protective gas. The cyclopentadiene can be stored at −20° C. in a dry atmosphere.

The palladium catalysts $[Pd(R^1—CN)_4]^{2+}(A)_2^-$ of the present invention can be prepared by methods known to those skilled in the art. Stable anions A which are suitable according to the present invention are those which are not nucleophilic. Preference is given to $BF_4^-$, $Sbx_6^-$, $PX_6^-$, $AsX_6^-$ $BiX_6^-$, where X is Cl or F, and/or $B(Ar)_4^-$, where Ar is phenyl which bears 1, 2, 3, 4 or 5 substituents which are, independently of one another, selected from the group consisting of F, Cl and $CF_3$, eg. $C_6F_5$ or $3,5$-di-$CF_3$-$C_6H_3$. Suitable radicals $R^1$ are $C_1$–$C_8$-alkyl groups, preferably $C_1$–$C_4$-alkyl groups and in particular methyl or ethyl groups.

Particular preference is given to complexes of these catalysts with palladium-coordinating agents, in particular olefins or diolefins. Suitable palladium-complexing agents are, for example, $C_1$–$C_{12}$-olefins such as ethylene, propylene or 1,2-butene, etc., cycloolefins such as cyclopentene or cyclohexene, $C_4$–$C_8$-diolefins such as butadiene, isoprene, 1,4-pentadiene or 1,5-hexadiene and cyclic diolefins such as norbornadiene or cyclooctadiene. Another suitable olefin ligand is the allyl radical (π-allyl). Preferred olefins or diolefins are selected from dicyclopentadiene, cyclopentene, norbornadienes, π-allyl, and/or cyclooctadiene. Accordingly, slight contamination of the monomer cyclopentadiene by the corresponding dimer dicyclopentadiene does not interfere with the polymerization, but according to the present invention is even advantageous. The addition of Pd-complexing agents enables the reaction times or reaction temperatures and the molecular weight to be controlled (the activity of the catalyst is reduced under the reaction conditions). Gel formation of the polymer, ie. crosslinking, is prevented and the solubility of the catalyst is improved.

The reaction temperature in the polymerization process of the present invention is advantageously in the range from about −100 to +100° C., preferably from −80 to +80° C. and in particular from −50 to +50° C. The reaction times are typically from 2 minutes to 168 hours, preferably from 15 minutes to 48 hours.

According to the present invention, the polymerization of cyclopentadiene advantageously takes place in an inert organic solvent in which the palladium catalyst is soluble. Examples of suitable solvents are halogenated or nonhalogenated alkanes such as pentane, hexane, dichloromethane, chloroform, carbon tetrachloride or dichloroethane; cycloalkanes such as cyclohexane; substituted or unsubstituted aromatic hydrocarbons such as toluene, benzene, xylene and chlorobenzene and/or nitroalkanes or nitroaromatics such as nitrobenzene or nitromethane or mixtures thereof. Preferred organic solvents are selected from dichloromethane, chloroform, carbon tetrachloride, dichloroethane, cyclohexane, toluene, chlorobenzene, nitrobenzene or nitromethane or a mixture thereof. When nitromethane is used as solvent for the polymerization, precipitation of the polymer occurs. Alternatively, the polymer may be precipitated using methanol or other strongly polar solvents in order to isolate it from the reaction solution.

The catalyst is used in a molar ratio of from 1:1,000,000 to 1:5, preferably from 1:100,000 to 1:20 and in particular from 1:100,000 to 1:200, based on the monomer cyclopentadiene. The concentration of the cyclopentadiene in the solvent may be in the range from 0.001 to 12.2 mol/l, preferably in the range from 0.1 to 12.2 mol/l.

The polymerization process of the present invention is preferably carried out with exclusion of water and oxygen, for example under nitrogen or argon as protective gas.

The polymers of the present invention can subsequently, if desired after prior isolation, be converted into derivatives in a manner known per se. For example, the polymerization can be followed by a reaction with organometallic compounds such as butyllithium, an addition of chloro compounds or a hydroformylation. Particular preference is given here to hydrogenation. This can be carried out partially or completely, using either heterogeneous or homogeneous catalysts which are generally employed in industry for hydrogenating polymers having olefinic double bonds.

Suitable heterogeneous catalysts are described in Rachapudy et al., J. Pol. Sci., 17 (1979), 1211, Tanzer et al., Macromolec. 17 (1984), 2708, DE 29 13 992, DE 30 46 008, DE 32 27 650, DE 39 05 432, DE 30 46 251, EP 200 029 and EP 354 413. Catalysts which can be used for homogeneous catalysis are disclosed, for example, in Storey et al., Macromolec. 24 (1991), 2920, mohammadi et al., Macromolec. 20 (1987), 2362, U.S. Pat. No. 3,700,637, DE 25 39 132, EP 134 023, U.S. Pat. No. 4,464,515, U.S. Pat. No. 4,503,196, EP 224 139 and EP 455 154.

Preferably, the hydrogenation is carried out using the Pd catalyst present in the solution from the polymerization. Here, isolation of the polycyclopentadiene from the reaction solution may be able to be omitted. In general, the hydrogenation is carried out in an autoclave under superatmospheric $H_2$ pressure and in an inert solvent. The $H_2$ pressure is usually in the range from 2 bar to 200 bar, preferably from 5 bar to 50 bar and in particular from 10 to 20 bar. Suitable solvents are, in principle, all solvents which are inert under the hydrogenation conditions, including, for example, the solvents mentioned above for the polymerization. The hydrogenation is preferably carried out at elevated temperatures, for example at from 50 to 150° C. The reaction times depend on the desired degree of hydrogenation and are typically in the range from 1 hour to 50 hours, preferably from 5 hours to 20 hours.

A particularly suitable catalyst is tris(triphenylphosphine) rhodium(I) chloride, also known as Wilkinson's catalyst. When using from 0.01 to 1 mol %, preferably from 0.1 to 0.5 mol %, of tris(triphenylphosphine)rhodium(I) chloride based on the double bonds to be hydrogenated, the hydrogenation may proceed to completion even at moderately high temperatures of from 20 to 120° C. The reaction is generally carried out in inert solvents in autoclaves. The reaction times are typically in the range from 1 hour to 50 hours, preferably from 10 hours to 20 hours.

The polymer obtained from the hydrogenation has a high thermal stability. In the case of partial hydrogenation, it can be further functionalized at the remaining double bonds.

The following examples illustrate the process of the invention.

EXAMPLES

Example 1

255 ml of dry dichloromethane were placed in a 1 l Schlenk flask under dry nitrogen as protective gas and cooled to 0° C. 75 g of freshly prepared cyclopentadiene were added. Another Schlenk flask was charged with 0.27 g of $[Pd(CH3CH_2CN)_4](BF_4)_2$, 0.35 g of dicyclopentadiene and 25 ml of dry dichloromethane. The catalyst solution was stirred for 5 minutes, during which time the color changed from yellow to brown. The solution was cooled to 0° C. and, using a hollow needle under nitrogen as protective gas, added to the monomer solution over a period of 40 minutes. The temperature in the solution was measured by means of a thermometer. After two hours, the solution became viscous and had a clear, golden color. After another 3 hours, the mixture was precipitated by addition of 5 ml of concentrated hydrochloric acid in 1 l of methanol. This gave a white polymer which was dried for 6 hours under reduced pressure (50° C., 0.01 torr). 48 g (64%) of polymer having a number average molecular weight determined by means of gel permeation chromatography (see above) of 90,000 were obtained. The polymer was stored under nitrogen in a refrigerator and remained soluble.

Example 2

In a Schlenk flask, 1.8 g of freshly prepared cyclopentadiene were dissolved in 8 ml of dichloromethane under dry nitrogen as protective gas and the solution was cooled to 0° C. In a further Schlenk flask, $[Pd(CH_3CH_2CN)_4](BF_4)_2$ dissolved in dichloromethane was admixed with 0.05 g of cyclopentene. The solution became yellow. After stirring for 5 minutes, the solution was added to the monomer solution and the mixture was stirred for 24 hours. The polymer was then precipitated in methanol and dried for 6 hours under reduced pressure (50° C., 0.01 torr). 1.4 g (70%) of polymer having a number average molecular weight of 33,000 were obtained. The polymer was stored under nitrogen in a refrigerator and remained soluble.

Example 3

In a Schlenk flask, 5.2 g of freshly prepared cyclopentadiene were dissolved in 8 ml of dichloromethane under dry nitrogen as protective gas and the solution was cooled to 0° C. In a further Schlenk flask, 0.004 g of $[Pd(CH_3CH_2CN)_4](BF_4)_2$ was dissolved in 5 ml of dichloromethane and the solution was cooled to 0C. The solution was then added via a hollow needle to the monomer solution. Then solution became green and part of the catalyst precipitated out. The solution was stirred for 24 hours, giving a viscous solution, and the polymer was precipitated in methanol. The polymer was dried for 6 hours under reduced pressure (50° C., 0.01 torr). 1.79 g (40%) of polymer having a number average molecular weight of 89,000 were obtained. The polymer was stored under nitrogen in a refrigerator and remained soluble.

Example 4

At −10° C. under an inert gas atmosphere, a solution of 24.4 mg of [Pd(CH$_3$CH$_2$CN)$_4$][BF$_4$]$_2$ in 4 ml of dichloromethane was added slowly while stirring to a solution of 2.64 g of cyclopentadiene in 6 ml of dichloromethane. The temperature was then allowed to rise slowly to 20° C. and stirring was continued for another 24 hours. The polymer was subsequently precipitated in methanol and dried under reduced pressure. 2.24 g (85%) of polymer having a number average molecular weight of 35,000 were obtained.

Example 5

In a 1.2 l autoclave, 15 g of polycyclopentadiene were hydrogenated in 1 l of toluene at 120° C. and a hydrogen pressure of 15 bar for 8 (sample A) or 16 (sample B) hours. After the reaction, the polymer was completely dissolved apart from a few gel particles. Determination of the double bond content of the polymer by iodometric titration in accordance with the method of Wijs (Ind. Engng. Chem. 15 (1943), 4531) gave a degree of hydrogenation of 30% for sample A and 74% for sample B.

Example 6

In a 1.2 l autoclave, 7 g of polycyclopentadiene were dissolved in 350 ml of toluene and admixed with 0.2 g (0.2 mol % based on the double bonds to be hydrogenated) of tris(triphenylphosphine)rhodium(I) chloride. After closing the autoclave, nitrogen was introduced three times to displace the remaining oxygen. The hydrogenation was carried out under a hydrogen pressure of 100 bar over a period of 12 hours while stirring at 70° C. The pressure was then slowly released and the polymer was precipitated in methanol. $^1$H NMR analysis indicated a degree of hydrogenation of 99.3%.

We claim:

1. A process for preparing cyclopentadiene homopolymers which comprises polymerizing cyclopentadiene in the presence of a palladium catalyst comprising a complex of the formula

$$[Pd(R^1-CN)_4]^{2+}(A)_2^-$$

where

R$^1$ is a C$_1$–C$_8$-alkyl group and

A is a stable anion.

2. The process defined in claim 1, wherein A$^-$ BF$_4^-$, SbX$_6^-$, PX$_6^-$, and/or B(Ar)$_4^-$, X is Cl or F and Ar is C$_6$F$_5$ or 3,5-bis(CF$_3$)-C$_6$H$_3$.

3. The process defined in claim 1, wherein the catalyst further comprises a palladium-coordinating olefin or diolefin.

4. The process defined in claim 1, which is carried out at a temperature of from about −100 to +100° C.

5. The process defined in claim 1, which is carried out in the presence of an inert organic solvent in which the catalyst is soluble as reaction medium.

6. The process defined in claim 1, further comprising subsequently hydrogenating the polymer.

7. The process defined in claim 6, wherein the hydrogenation is carried out in the presence of tris(triphenylphosphine)rhodium(I) chloride as catalyst.

* * * * *

UNITED STATES PATENT AND TRADEMARK OFFICE
CERTIFICATE OF CORRECTION

PATENT NO. : 6,169,153 B1
DATED : January 2, 2001
INVENTOR(S) : Risse et al.

Page 1 of 1

It is certified that error appears in the above-identified patent and that said Letters Patent is hereby corrected as shown below:

Claim 2, column 6,
Line 19, "wherein $A^-$ $BF_4^-$," should be -- wherein $A^-$ is $BF_4^-$, --.

Signed and Sealed this

Ninth Day of October, 2001

Attest:

*Nicholas P. Godici*

NICHOLAS P. GODICI
*Attesting Officer*     *Acting Director of the United States Patent and Trademark Office*